(12) United States Patent
Coombs et al.

(10) Patent No.: US 7,165,154 B2
(45) Date of Patent: Jan. 16, 2007

(54) SYSTEM AND METHOD FOR DATA BACKUP

(75) Inventors: David Lawrence Coombs, Montreal (CA); Ozren Papic, Oak Ridges (CA)

(73) Assignee: Net Integration Technologies Inc., Markham (CA)

( * ) Notice: Subject to any disclaimer, the term of this patent is extended or adjusted under 35 U.S.C. 154(b) by 0 days.

(21) Appl. No.: 10/390,038

(22) Filed: Mar. 18, 2003

(65) Prior Publication Data

US 2004/0030852 A1    Feb. 12, 2004

Related U.S. Application Data

(63) Continuation-in-part of application No. 10/098,553, filed on Mar. 18, 2002, now abandoned.

(51) Int. Cl.
*G06F 12/16* (2006.01)
(52) U.S. Cl. .................. 711/162; 714/6; 714/5
(58) Field of Classification Search ........... 711/161, 711/162, 159; 707/204; 714/6
See application file for complete search history.

(56) References Cited

U.S. PATENT DOCUMENTS

| | | | | |
|---|---|---|---|---|
| 5,758,359 | A * | 5/1998 | Saxon | 707/204 |
| 5,813,009 | A * | 9/1998 | Johnson et al. | 707/100 |
| 5,819,020 | A * | 10/1998 | Beeler, Jr. | 714/5 |
| 6,061,770 | A * | 5/2000 | Franklin | 711/162 |
| 6,397,307 | B1 * | 5/2002 | Ohran | 711/161 |
| 6,415,300 | B1 * | 7/2002 | Liu | 707/204 |
| 2002/0013832 | A1 * | 1/2002 | Hubbard | 709/220 |
| 2002/0015020 | A1 * | 2/2002 | Mobin | 345/156 |

FOREIGN PATENT DOCUMENTS

JP        03-232012      * 10/1991

OTHER PUBLICATIONS

David Patterson et al., "Introduction to Redundant Arrays of Inexpensive Disks (RAID)", COMPCOM Spring '89. Thirty-Fourth IEEE Computer Society International Conference; Intellectual Leverage, Digest of Papers; Mar. 1989; pp. 112-117.*

* cited by examiner

*Primary Examiner*—B. James Peikari
(74) *Attorney, Agent, or Firm*—Kent Daniels; Ogilvy Renault LLP

(57) ABSTRACT

A method and system of data backup for a computer system is disclosed. Full and incremental backups of data stored to a first storage device coupled to the computer system are stored to a backup storage device coupled to the computer system. The backup storage device may be remotely located and coupled via a network. Data representative of the relationship of each incremental backup to its respective parent backup is stored in a dependency data structure, preferably a tree-like structure. Different types of incremental backups may be performed to provide different data granularity. When two or more storage media are used in a rotational manner, each medium always contains a complete backup. The backup storage device is automatically managed by paring at least one of a full and incremental backup at the backup storage device automatically in accordance with a plan. The plan is preferably configured to manage an amount of available storage space at the backup storage device. When restoring data from a backup, data to be restored that is stored in a parent backup is automatically located and restored. Stored backups may be encrypted and decrypted when restored.

24 Claims, 7 Drawing Sheets

SYSTEM AND METHOD FOR DATA BACKUP

RELATED APPLICATION

This application is a continuation-in-part of U.S. application Ser. No. 10/098,553 filed Mar. 18, 2002 now abandoned.

TECHNICAL FIELD

This application relates to the backup of data in a data processing system, including backup data management and restore.

BACKGROUND OF THE INVENTION

An integral part of modern data processing systems is data storage by means of data storage devices and storage media. Such devices and media particularly include devices with high-capacity random read write capabilities such as hard disk drives and their disks. Hard disks can fail at any time, and indeed all will fail eventually as their components wear out. Power surges and other environmental factors can destroy storage devices. Moreover, users can destroy data: they can accidentally delete important files or knock servers over, destroying the hardware within. Sometimes, the data is recoverable. Often, some, most, or all of the damage is irreparable.

Preventative measures such as better power regulation or improved hardware product quality can reduce the risk of catastrophic failures. But such measures cannot eliminate the risk of data loss.

It is a well known technique to further lessen the risk of loss of data by adopting a redundancy policy, periodically backing up data stored on a primary data storage device to another storage device for safe-keeping. If the data is regularly copied to another storage device, a recent copy can be restored in the event that the data is lost from the primary storage device.

Modern systems, especially those that contain the data of many users, almost always have backup systems. But these systems can often be tedious: they can be slow and complex, requiring significant user intervention. The backed up data is sometimes less than complete. Often, as a result, users fail to diligently backup the data storage devices.

Determining which files to restore from a collection of backup data can be particularly difficult as well. The backup files of a single user may be spread over many backup media necessitating the location and loading of each media and the restoration of the desired files.

To further support data recovery in the event that the data processing system from which the data is backed up or the facility housing the data processing system becomes unusable, backed up data stored to removable or otherwise transportable media is often stored off-site, preferably in a secure remote facility. Transporting and storing the media off-site and logging the media to support later identification adds significant time and effort to a backup procedure. While such measures add robustness to backup operations, there is a cost disincentive to performing a proper and complete procedure.

What is therefore desired is a solution that addresses some or all of the above noted deficiencies.

SUMMARY OF THE INVENTION

In accordance with the invention, in one aspect there is provided a method of data backup of data stored in a first storage device coupled to a computer system. The method comprises steps of storing to a backup storage device coupled to the computer system at least one full backup. Each full backup comprises a copy of the data selected from the first storage device in accordance with a first criteria and attribute data representative of attributes of the selected data. A further step comprises storing to the backup storage device zero, one or more incremental backups where each incremental backup is a copy of data selected from the first storage device in accordance with the first criteria and a second criteria and attribute data representative of attributes of the selected data. The second criteria is determined in relation to a parent backup to the incremental backup where the parent backup comprises one of a selected full backup and incremental backup previously stored to the backup storage device. A further step comprises storing in a dependency data structure parent data representative of the relationship of each incremental backup to its respective parent backup. Preferably the data dependency structure is a tree-like structure.

The method may also comprise periodically performing the storing steps in accordance with two or more time intervals and respective second criteria to store different incremental backup types to provide different data granularity. Preferably, the data dependency structure is stored to the backup storage device.

In accordance with a feature of the method, the backup storage device may be operable with one or more storage media. As such, the method described may comprise the steps of providing at least two storage media and the storing using said at least two storage media in a rotational manner. Further, for each incremental backup to be stored to a one of the storage media, the second criteria is determined in relation to a parent backup stored to the one of the storage media.

Preferably the method includes a verification step to verify the storing of the selected data stored to the backup storage device. Additionally, the backup process preferably includes a compression step to compress a backup prior to a final storing to the backup storage device. The backup may be prepared as described herein and the backup compressed in blocks of bytes, for example 256K byte blocks, in accordance with conventional compression techniques understood to persons skilled in the art.

In accordance with an aspect of the invention, the method thus described may include steps to manage the backups stored to the backup device automatically in accordance with a plan. The plan preferably balances the desire to maintain the availability of data backups with the need for storage space for additional data backups. Accordingly, the method preferably includes the step of paring at least one of a full and incremental backup at the backup storage device automatically in accordance with a plan to manage the full and incremental backups. The plan may be configured to manage an amount of available storage space at the backup storage device, for example, using logs of the size of the data backed up.

In accordance with a further feature, the method may be practiced with a computer system comprising one or more backup storage devices, at least one of which is coupled to the computer system via a network and located remotely of said computer system. The method includes transmitting the full backup and the incremental backup to the at least one backup storage device located remotely of the computer system. The transmitting may be performed in accordance with a protocol for encrypting and decrypting data transmissions.

In accordance with yet a further feature the method may include encrypting the copy of the data to be backed up for storing to the backup storage device.

In accordance with a yet another aspect of the invention, the method thus described may include steps to facilitate the restoration of data stored to the backup storage device. The data may be restored to a second storage device coupled to the computer system. Persons skilled in the art understand that the second storage device may comprise the first storage device from which the data was originally backed up. The method preferably includes the steps of identifying a backup stored to the backup storage device comprising data to be restored to the second storage device. This backup defines a current backup. The data to be restored to the second storage device may be copied from the data stored to the current backup and any of zero or more parent backups to the current backup as identified in response to the dependency data structure. Data backed up may be encrypted for storing to the backup storage device and decrypted for restoring.

In still other aspects of the invention, there is provided a computer system and a computer readable medium containing executable program instructions configured accordingly such as a computer readable medium containing executable program instructions for backing up data from a first storage device to a backup storage device, said devices coupled to a computer system, the computer readable medium comprising program instructions for directing the computer system to implement any one of the method aspects.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1A:
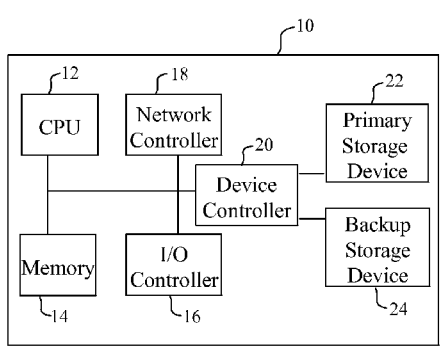
FIGS. 1A, 1B and 1C are each a block diagram of a data backup management and restore system in accordance with an embodiment of the invention.
Figure 1B:
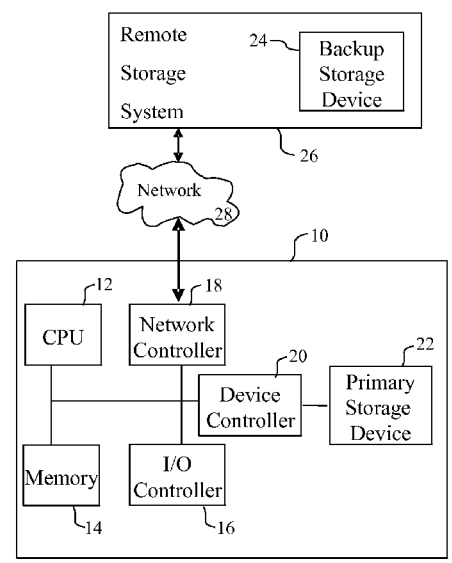
Figure 1C:
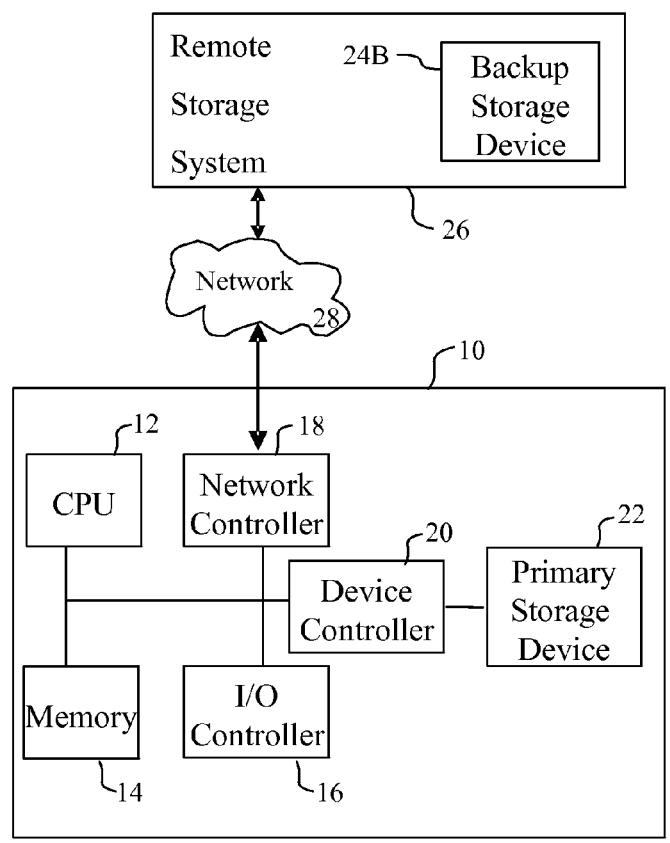

FIGS. 1A, 1B and 1C illustrate, in block diagram form, exemplary computer systems 10 for digital data processing configured for data backup, management and restore capabilities in accordance with embodiments of the invention. Computer system 10 includes a central processing unit (CPU) 12 coupled to memory 14, such as random access memory (RAM), read only memory (ROM), programmable ROM and the like. CPU 12 is also coupled to an input/output (I/O) controller 16 for controlling one or more input and/or output devices (not shown) such as a keyboard, a pointing device, etc., a network controller 18 for network communication with one or more other computer systems 26 (FIGS. 1B and 1C) and a storage controller 20 for communication with a primary storage device 22 and a backup storage device 24.

Computer system 10 may be a multi-user or single-user system, including a server, mainframe, personal computer (PC), workstation, laptop, or the like. Each of primary storage device 22 and backup storage device 24 includes rewriteable media such as a fixed disk drive, mountable (i.e. selectively removable) disk drive, disk drive array or other rewriteable media, though magnetic tape or other sequential media are not preferred.

The exemplary computer system 10 is a generalized system as is understood to persons skilled in the art. Numerous modifications will be apparent. For example, primary storage device 22 and backup storage device 24 may be connected to separate controllers (e.g. integrated device (or drive) electronics (IDE) controllers) or with both devices 22 and 24 connected to the same IDE controller in a master and slave relationship. The controller may be in accordance with the small computer system interface (SCSI) standard, enhanced IDE (EIDE) standard or any other method of connecting storage devices to computers.

Computer system 10 may include further storage devices and respective controllers therefor such as a floppy disk drive, a CD-ROM drive, a tape drive, flash disk drive (all not shown). Additionally, computer system 10 may include a plurality of I/O controllers for a variety of I/O devices such as a keyboard, display screen, pointing device, etc. While only a single CPU 12 is illustrated, a multiprocessor configuration may be employed as is well known to those skilled in the art.

While primary storage device 22 and backup storage device 24 are shown as included within computer system 10, one or both of the primary and backup storage devices 22 and 24 may be coupled to computer system 10 via network communication through network controller 18 (FIGS. 1B and 1C). For example, computer system 10 may comprise a server system having a local primary storage device 20 such as, for example, a redundant array of independent (or inexpensive) disks (RAID) device. Backup storage device 24 may comprise a larger capacity storage device, such as a RAID device, coupled to a remote backup system 26, such as a server resident at a remote computer facility. Remote computer system 26 is coupled to server system 10 via a high-speed network 28 such as the Internet, private network or the like. A RAID provides relatively convenient, low-cost, and highly reliable storage by saving data on more than one disk simultaneously. Persons skilled in the art will understand that a RAID device is an exemplary storage device, that public or private networks other than the Internet may be used for communication between server system 10 and remote system 26 and that server system 10 need not be a server at all but may a personal computer, work station or the like, including a home located computer.

Housing remote system 26 in a facility that is distant from the facility housing system 10, preferably in a secure data processing environment well known to persons skilled in the art, provides enhanced security to a backup procedure as any backed up data is automatically remotely stored away from the facility being backed up. This redundancy strategy supports system recovery in the event that system 10 is inaccessible. Remote system 26, the remote storage facility or any related services may be provided by a third party service provider to owners and operators of systems such as system 10.

FIG. 1C illustrates a third embodiment of system 10 in accordance with the invention having both a local backup storage device 24A and a remote backup device 24B. As described further herein below, backup may be performed to local storage device 24A, remote storage device 24B or both.

In a preferred embodiment, CPU 12 is a general purpose processor such as an AMD Athlon™ processor from Advanced Micro Devices, Inc. or Intel Pentium™ processor from Intel Corporation running under the control of a LINUX operating system (LINUX is a trademark of Linus Torvalds) (not shown). Computer system 10 includes a conventional file system and, typically, one or more application programs in a conventional configuration (all not shown). In the preferred embodiment discussed herein, backup processes, management processes and restore processes are performed by CPU 12 under the control of software prepared in accordance with the invention disclosed herein to backup data stored on primary storage device 22 to backup storage device 24, manage the backup data on backup storage device 24 and restore the backup data.

A primary storage device such as device 22 typically contains two general data types, namely system files and user files. Once loaded and configured via one or more system configuration files, most system files rarely change over time. Preferably, the system files may be coupled to computer system 10 via a separate storage device such as a 32 Mb flash disk available from SimpleTech, Incorporated of Santa Ana, Calif. Conveniently, such storage devices provide quick access times for transferring data to CPU 12 and are primarily read-only in nature thus reducing the need for backup. Any system configuration files may be stored on primary storage device 22 to permit changes to the configuration and to facilitate convenient backup with other user files.

Backup, restore and management of system 10 in accordance with the present invention may be first understood with reference to the embodiment of FIG. 1A.

In accordance with a preferred practice of the invention, the backup process coordinates periodic "full" (i.e. non-incremental) and "incremental" backups of the one or more system configuration files and the user files from primary storage device 22 to backup storage device 24. A full backup is a copy at a particular point in time of all the files to be backed up from primary storage device 22. An incremental backup is a copy at a particular point in time of data files to be backed up from primary storage device 22 and that were changed or added to primary storage device 22 subsequent to a previous backup. The incremental backup may be performed relative to a full backup or an another incremental backup as is well understood by persons skilled in the art. Moreover, the previous backup from which an incremental backup is based need not be the most recent backup as will be explained further below.

In order to lessen user burden, preferably the software for coordinating the backup process may be pre-configured to define certain default parameters indicating, for example, which system configuration files and user files are to be backed up and the respective periods for the one or more types of full and incremental backups. User input may be enabled to configure the frequency (i.e. periodic time intervals) of the full and incremental backups or the specific day or time of day for the performance of such backups as described further below.

In accordance with a preferred practice of the invention, a full backup is automatically configured for performance once per month and is hereinafter referred to as a "monthly" backup. A user may select a preferred day of the month and/or time of day for the commencement of the monthly backup though this parameter may be pre-configured with a default setting. Three types of incremental backups are predefined, namely "weekly", "daily" and "micro" incremental backups. A weekly backup uses the most recent monthly backup as a parent (i.e. base) backup. That is, anything changed since the last monthly backup is backed up in the weekly backup. A weekly backup is performed after seven days as described below.

Once a day, an incremental daily backup is performed using the most recent weekly or monthly backup as a parent. If a weekly backup is not available, such as at the early stages of the backup process before the end of the first week, a monthly backup may be used as the parent of a daily backup. User input may also be permitted to enable the selection of the time of day for such a daily backup, for example, late at night or otherwise during an expected low usage period for CPU 12

Additionally, at a user-defined interval, if none of the above three situations applies, an incremental micro backup is performed using the most recent backup (either micro, daily, weekly or monthly) recorded on backup storage device 24 as a parent. The micro backup interval may be selected according to user preference and is preferably pre-configured to a default setting such as every 15 minutes.

For example, Table 1 shows chronologically how backup dependencies are formed including how initial daily backups are based on the first monthly backup. The sequence of backups in Table 1 assumes that backups do not get deleted. The delete feature of the management process is described further below.

TABLE 1

| Backup # | Parent is # | Type |
| --- | --- | --- |
| 1 | (no parent) | Monthly |
| 2 | 1 | Micro |
| 3 | 2 | Micro |
| 4 | 3 | Micro |
| ... | ... | Micro |
| 97 | 1 | Daily |
| 98 | 97 | Micro |
| 99 | 98 | Micro |
| ... | ... | Micro |
| 193 | 1 | Daily |
| 194 | 193 | Micro |
| ... | ... | (Micro/Daily as applicable) |
| 673 | 1 | weekly |
| 674 | 673 | Micro |
| ... | ... | Micro |
| 769 | 673 | Daily |
| 770 | 769 | Micro |
| ... | ... | ... |
| 2689 | (no parent) | Monthly |

Figure 2:
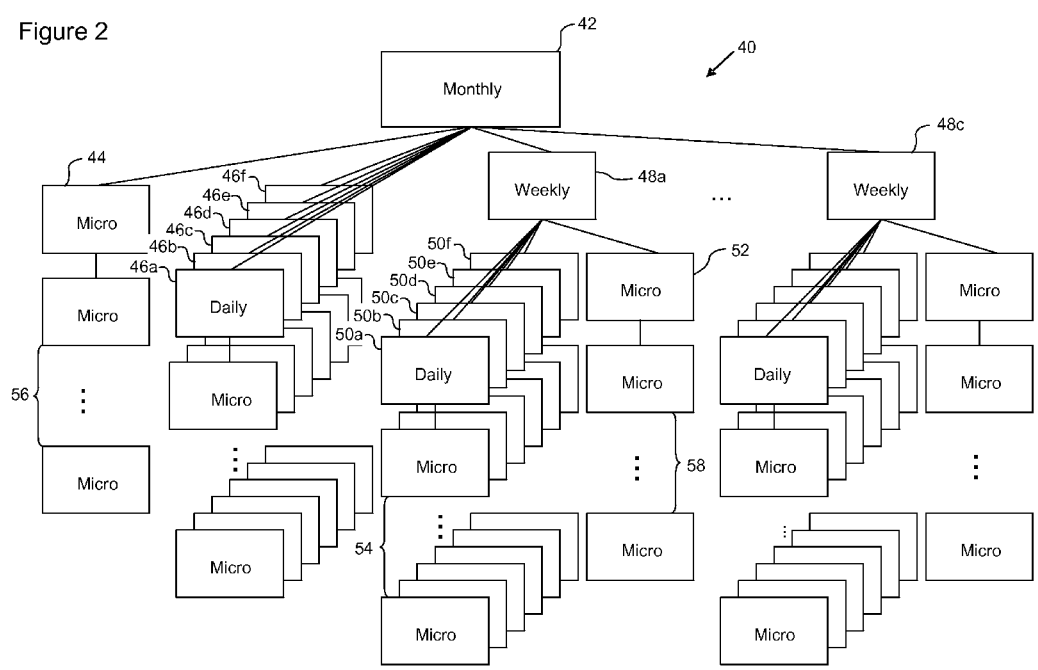
FIG. 2 illustrates a sample dependency structure for organizing backups in accordance with the present invention.

Referring to FIG. 2, there is illustrated in graphical form a sample backup dependency structure in accordance with the present invention. The backup dependency structure for a 28-day notional month of backups is depicted as a tree 40 having a plurality of nodes each representing an individual full or incremental backup. A node is connected to another node by an edge denoting a parent/child dependency between the joined nodes whereby a child node depends from a parent node if the parent node represents a base backup for the backup represented by the child node. While a full backup interval such as the notional month having a consistent number of days is convenient to implement, a full backup interval may be implemented to coincide with calendar months or another time period such as a quarter of the year, fortnight, etc.

Tree 40 includes monthly root node 42 representing a full backup. This monthly backup is the base for a plurality of incremental backups represented by micro node 44 for the first day's backups, six subsequent daily nodes 46a, 46b, 46c . . . 46f representing the remaining six days of the first week, and three weekly nodes 48a, 48b (not shown) and 48c for the final three weeks of the 28 day month. Each of the foregoing incremental micro, daily and weekly backup nodes are root nodes of respective sub-trees representing backup activities for respective days and weeks of the month. For example, from weekly node 48a depends six daily nodes 50a, 50b, 50c . . . 50f and a micro node 52. Daily node 50a is a parent for a chain of 95 micro backups (collectively designated 54). Similarly, the other daily nodes are respective parents to other chains of 95 micro backups. Micro nodes 44 and 52 are respective parent nodes of two chains of 94 micro nodes (respectively collectively designated 56 and 58). At the end of the month, assuming no deletions, there is one monthly backup, three weekly backups, 24 daily backups, and 2660 micro backups. Any particular backup may be selected and restored in whole or part as described further below.

Structuring the backup dependencies in a tree-like structure facilitates convenient backup, restore and paring (i.e. deletion of the backup and its removal from the tree structure) when the backups are deemed unnecessary or once the backup storage device is full, without sacrificing a comprehensive set of backups. Other structures for organizing the various backups in accordance with the dependency of each backup may be envisioned by those skilled in the art.

The backup process is configured to operate as follows. Initially, the type of backup is determined. If the type is an incremental backup, the parent backup therefor is determined from the dependency data structure. The parent backup is read from device 24 to retrieve its index (i.e. signals representative of attributes of the data comprising the backup where the attributes include a list of all files and their respective file attributes as described further below). The reference to file herein includes directory or folder or such other structure for storing and organizing data in files. The list of files from the retrieved index, along with the last-changed time file attribute for each file are useful for determining which files are to be stored in a new incremental backup. If the backup type is a full backup, it is not necessary to determine the parent backup.

Whether performing a full or incremental backup, the entire file structure at the primary data storage device is scanned to establish a list of every file and their file attributes, such as, last-changed time, size, permission attributes, owner and group identifiers, and any implementation-specific flags that may be desired for constructing a backup index. To store the backup on device 24, a backup header, including, for example, a name of the computer system and/or primary storage device being backed up, backup date/time, backup software version, and other attribute indicators is prepared and written to the device. The index of files determined from the scan may be traversed to locate appropriate files and directories for backup. For a full backup, the contents of each and every file and directory is stored to device 24. For an incremental backup, the contents of only those files that have a last-changed date that is newer than the corresponding last-change date for the respective files determined from the parent backup index are stored. If a file is located by the file structure scan that was not present in the parent backup index, the file is deemed to be new and backed up accordingly. If the content of a file is not backed up, an "unchanged" flag (i.e. attribute) therefor is included in the new incremental backup's index. This attribute is useful for a future restore to indicate that processing the immediate parent backup (at least) will be necessary in order to restore that file.

The backup index including the attribute information noted in the scan process and backup storing process is also stored to backup storage device 24. Further, dependency data structure 40 is updated to account for the new backup, adding a dependent node to the appropriate parent node for an incremental backup or establishing a new parent node for a full backup as is applicable. Signals representative of the tree structure data 40 are preferably stored on backup storage device 24. Though a backup of the entire primary storage device 22 is described, it is understood that the backup process may be configured to store only selected files or not backup selected files and directories in accordance with criteria established by user intervention or set by default configuration.

The backup procedure preferably includes a verification step similar to a full restore of the current backup, reading a portion of each file backed up but without restoring any of the files to the primary storage device 22. When verifying, a small header portion at the beginning of each file copied to the backup may be evaluated to determine whether the file begins at the offset into the backup indicated by the index for the backup. The offset may be determined in accordance with a file size stored in the index for the files stored in the backup. Verification is performed primarily as a redundancy check and to evaluate any hardware failures. Once a backup is verified, it may be marked as such. A backup that does not pass verification (because it failed or because the process was interrupted by user intervention or a power outage) is preferably not used as a parent backup.

The management process manages the backups stored on the backup storage device 24 in accordance with preferences that balance the desire for granularity (i.e. the availability of many backups) and the available storage space. For example, during operation of the backup process, should the backup storage device 24 have insufficient storage space remaining to store a new backup, one or more recorded backups are automatically pared by the management process to permit continued operation of the backup process. The management process determines from the backup tree structure 40 which backups to pare according to the following general guidelines.

When choosing a backup to delete, at least one old full backup, i.e. one or more monthly backups should be maintained. Further, fine granularity for recent backups, (i.e. micro backup period) should be maintained, if possible. Between the two extremes of recent to old backups, the preference for fine granularity generally decreases and thus older incremental backups may be pared according to preferences. One preference may be to automatically delete a micro backup once it is more than 7 days old, even if available storage device space is plentiful. A further preference may be to maintain a certain number of weekly backups and eliminate older daily backups.

Figure 3A:
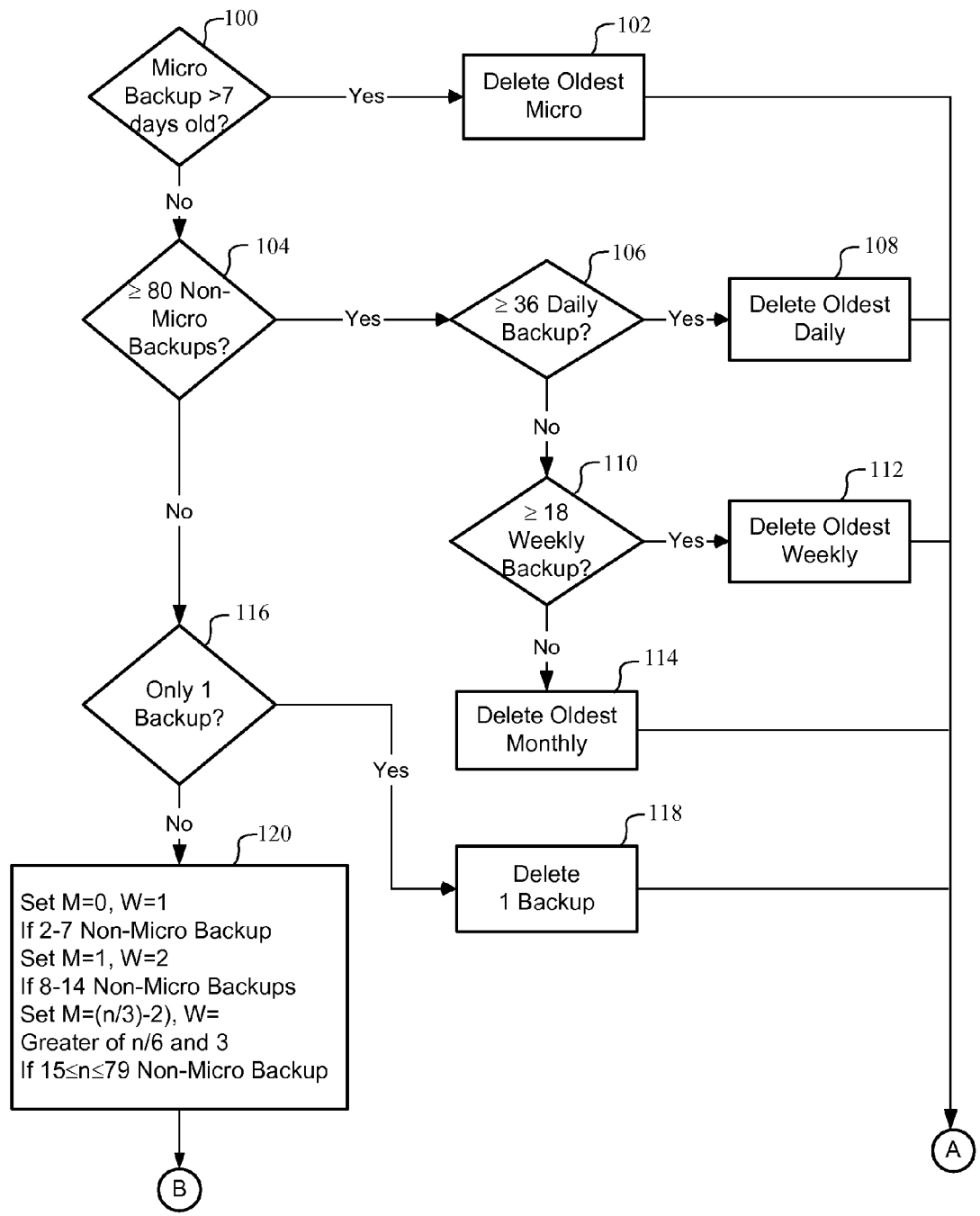
FIGS. 3A, 3B and 4 are flow diagrams of operational steps of the backup system and method of the present invention.
Figure 3B:
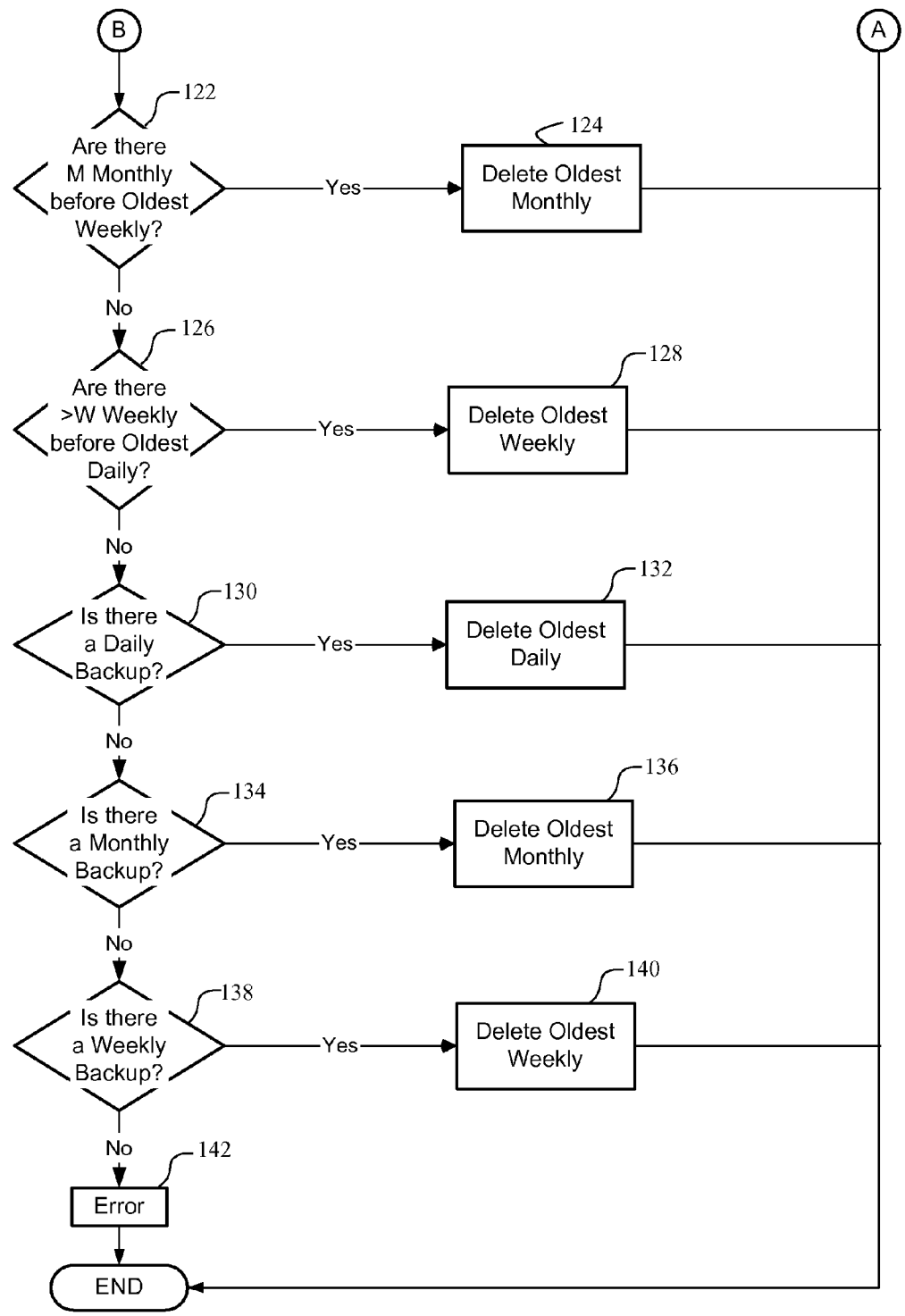

A preferred manner for choosing a backup to pare is illustrated in flow chart form in FIGS. 3a and 3b. At step 100, the tree structure generated during the backup process is examined to determine whether there is a micro backup more than 7 days (i.e. a week) old. If there is such a micro backup, it is pared from the tree structure and backup storage device 24. Otherwise, at step 104, a determination is made whether there are 80 or more backups, not including micro backups. If so, at step 106, a further determination is made whether at least 36 are daily backups (i.e. there are at least 6 weeks of daily backups stored). In such a case, the first (i.e. oldest) daily backup may be pared (step 108). If there are fewer than 36 daily backups, at step 110 a determination is made whether there are 18 or more weekly backups (i.e. 6 months of weekly backups). At step 112, the oldest weekly backup is pared. Otherwise, at step 114 the oldest monthly backup is pared.

At step 116, if there are fewer than 80 backups (not including micro backups), it is determined whether there is only a single backup. In such a case, only one backup will likely ever fit. The one backup is pared at step 118 to free the needed space for an immediate backup and preferably a notification is made to an operator that adoption of a larger backup storage device and/or media should be considered.

Otherwise and without regard to any micro backups, at step 120 the following operations are performed:

If there are at least 2 and at most 7 backups, set M=0, W=1;

If there are at least 8 and at most 14 backups, set M=1, W=2; and

If the number of backups 'n' satisfies (15<=n<=79), set M=(n/3)−2, and W=greater of n/6 and 3.

If the number of monthly backups that pre-date the oldest weekly back up is greater than M as defined above (step 122), the oldest monthly is pared at step 124. Otherwise, if there are more than W weekly backups that predate the oldest daily backup (step 126), the oldest weekly is pared at step 128. Failing which, at step 130 a determination is made whether there is a daily backup to delete. At step 132 the oldest such daily is pared if present. Otherwise, at step 134 a determination is made whether there is a monthly available for paring. If so, at step 136 the oldest is pared. Failing which, at step 138 the tree structure is examined for a weekly backup. If available, at step 140 the oldest weekly backup is pared. Otherwise, an error result may be notified (step 142).

In general, the preferred manner of managing the backup data keeps six weeks of daily backups, six months of weekly backups, and as many monthly backups as will fit on backup storage device 24. If the amount of storage space provided by device 24 permits the storage of only a relatively few backups (i.e. between 2 and 7 backups) before there is insufficient space to add an additional backup, the management process is configured to preserve a month's worth of backups, if possible. If the amount of space on device 24 permits a moderate number of backups to be stored (i.e. between 8 to 14 backups), a balance of the three main types (monthly, weekly and daily) is maintained. Otherwise, the management process operates to keep, with reference to the number of non-micro backups stored, one third monthly backups at the beginning, one sixth weekly backups after that, and then the regular mix of mostly daily backups.

The above description assumes there are no unverified backups stored to backup device 24. If there are one or more unverified backups present, they are preferably deleted before deleting a verified backup.

With up to 96 incremental backups scheduled for each day on a 15-minute micro backup interval, restoring files could potentially be tedious work for a user. In accordance with a restore process of the invention, restoring data at the level of any particular incremental backup automatically restores appropriate data from the list of parent backups too.

Since the backup process is configured to perform a full backup upon a first use of a backup storage media, each backup storage device always contains a complete, consistent backup set. Thus, even if a plurality of backup media are used in a rotational scheme, typically in combination with off-site storage of the backup media not presently in use, as is well understood to those skilled in the art, any one backup media may be used to fully restore the primary storage device to the date of the most recent backup on the media. Further, following a rotation of the media, the first backup will be an incremental, based on a backup that is already present on the media disk, rather than based on the last backup performed with the prior media. Conveniently, a backup storage media employed in the backup and management processes of the invention will always permit a full restore.

Figure 4:
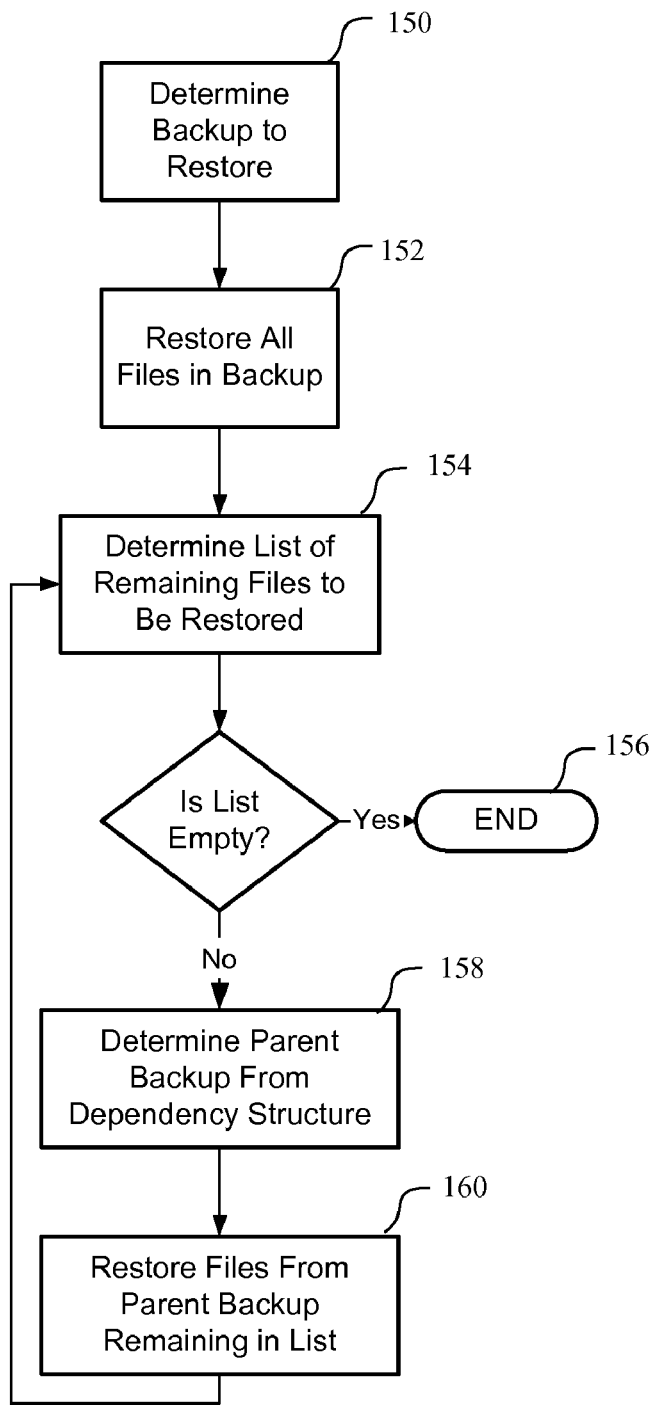

The restore process is configured to operate as follows and as illustrated in flow chart form in FIG. 4. While a restore process is usually performed to restore data to the same storage device from which it was originally copied (i.e. a first device) the restore process may be configured to copy the data to be restored to another storage device (i.e. a second device coupled to the computer system (not shown)). Thus, persons skilled in the art understand that the second device may comprise the first device.

At step 150 the backup to restore is determined. The restore process is described with reference to the restore of an incremental backup and it is understood that similar operations may be performed to restore a full backup. The determination of the appropriate backup to restore may be initiated via a user interface, preferably a graphical interface (GUI), as is understood to a person skilled in the art, to permit an operator to choose a particular incremental backup, in whole or in part.

Alternatively, a default may be configured within the restore procedure directing the restore of the most current backup automatically following initiation of the restore procedure. The restore may be initiated by a user command via a GUI or other computer interface or through hardware means such as a control button (not shown) configured to control processor 12. Similarly, the backup process may also be commenced in accordance with user demand by an appropriately configured control button (not shown) or user interface.

As previously described, each backup contains a list of all files present on the primary storage device at the time of the backup. The list further indicates which of those files were not copied to the backup storage device since they were not changed or new. In step 152, once the incremental backup to be restored is determined, the restore procedure restores each file identified to be restored that is present in the particular incremental backup. In step 154, a list of remaining files and/or directories to be restored is prepared. Conveniently, the "unchanged" attribute facilitates this preparation. In step 156, if the list is empty, the restore procedure stops. In step 158, if the list is not empty, the parent backup of the backup just restored is determined from the tree structure and opened. In such a case, every file or directory present in the parent backup and identified in the list of remaining files is restored to the primary storage device in step 160. Following the restore of the parent backup, similar operations are performed for the items remaining in the list of files and directories with respect to a parent backup as indicated by a return to step 154. The restore procedure eventually terminates at step 156 since the files indicated to be restored will either be located in the one or more incremental backups or the root monthly backup linked in the tree structure.

In order to have sufficient capacity for storing full and incremental backups to provide desired granularity and convenience of backup and restore while balancing other considerations such as cost, applicant has determined that a backup storage device that is generally 1.5 times larger than the primary storage device is sufficient. Of course, persons skilled in the art will appreciate that the capacity of the backup storage device may be chosen with reference to the anticipated use of the primary storage device to be backed up. A backup storage device that is suitable for backing up a primary storage device used as a server for a plurality of users in a small office business environment will likely be different from a backup device for a similar server environment which maintains one or more very large files that may be frequently changed. Small office business users typically have relatively small files compared to the capacity of the primary storage device. Graphics/animation files for a multimedia shop or database files are often much larger. Primarily, desired backup capacity depends upon an anticipated frequency of file change and addition and the size of the changed and added files, preferably the size following compression, among other factors.

Conveniently, micro backups increase the ability of a user to retrieve a desired version of a file. For example, if a user worked on a file from 9:00 AM to 1:20 PM and the file was lost due to inadvertence or system error, then a restore from a 1:15 PM micro backup can be performed with a loss of about 5 minutes work. In accordance with the preferred management procedure for paring backups, for a short-term recovery period of about 7 days, a user can generally find a backup with almost exactly the file or file version desired. When the present invention is implemented on a small enterprise server system for a business office environment, since not very much usually changes on such a server in 15 minutes, the incremental backups are generally very small. Unless a majority of the files on the server are continuously undergoing changes or the files are very large relative to the capacity of the primary storage device, the anticipated space to be used by these 15 minute backups is a small fraction of the available capacity of the backup storage device.

Preferably, for local backup devices 24, the backup medium is a hard disk or other high speed read and write device is a hard disk or other high speed read and write device and preferably of a selectively removable variety. The speed of such a medium makes it possible to do backups every 15 minutes. Removable drive trays for hard disks facilitates conventional rotation and off-site storage of media, often associated with tape backups.

Backup to a remote storage system such as remote storage system 26 (FIGS. 1B and 1C) obviates transportation via removable media. Rather than store backup data to media local to system 10 (FIG. 1A), data may be transmitted to backup device 24 via a network 28 coupled to system 10 (FIG. 1B). In a further alternative, data may be selectively backed up to a remote device 24A or locally to remote device 24B or to both devices using a system 10 as illustrated by FIG. 1C.

Backup, restore and management of system 10 in accordance with the present invention will now be described with reference to the embodiments of FIGS. 1B and 1C. In accordance with the invention, a plurality of alternate remote backup, restore and management configurations are contemplated for a system such as system 10 of FIGS. 1B and 1C, which configurations may be facilitated by programming.

Remote backup, restore and management share many operations in common with its local counterpart. Differences therebetween are described herein below.

As illustrated in FIGS. 1B and 1C, computer system 10 may be coupled for communication via network controller 18 and a network 28 with a remote storage system 26 having a backup storage device 24 or 24B. The primary difference between the embodiments of FIGS. 1B and 1C is that FIG. 1C shows system 10 with a local backup storage device 24A and coupled with a remote backup storage device 24B while system 10 of FIG. 1B is only coupled with a remote backup storage device 24. Computer system 10 may also be referred to as local system 10 hereinafter with reference to FIGS. 1B and 1C. Though not shown, remote storage system 26 of either remote embodiment may be configured like computer system 10 with a CPU, memory, network and I/O controllers, etc. Remote storage system 26 is further adapted to receive and store backups from local system 10 and to restore backups as may be required and as described more fully below. Such operations may include the authentication of communications between local system 10 and remote system 28. Remote system 10 may be further configured to manage backups it receives and stores to its backup storage device 24 or 24B in accordance with the invention independent of such management operations performed by local system 10. However, such a feature of the present invention is understood to be optional. Hence, remote storage system 28 need not be extensively customized to enable the present invention.

A first exemplary embodiment of remote backup, restore and management differs only slightly from the local counterpart described above with reference to FIG. 1A. The chief difference between remote and local operations relate to transmitting data over network 28 for the remote embodiment.

Additional security concerns arise within the remote storage embodiment. When transmitting data over a public or other insecure network 28, or as desired when transmitting over a private network, or when storing backup data to a backup device that is accessible via a remote storage system, backup data may be encrypted prior to its transmission to remote storage system 26. Encryption may be performed by using the operations of a symmetric public/private key encryption algorithm or other strong encryption technique as is well known to persons skilled in the art. In this way, the data cannot be deciphered normally by a party intercepting the transmission. Further, when stored to device 24, the backed up data cannot be deciphered normally by any party having access to remote system 26.

The encryption key may be securely stored locally to system 10 to facilitate easy access. The key may be stored in a file on primary storage device 22 or to a removable media (not shown) accessible to an administrator or other user having suitable permission to use system 10. The encryption key may comprise a hashed password determined using a technique to generate a unique string of a desired length to suit the symmetric encryption algorithm. One such technique is MD5, though others are known to persons skilled in the art. In this way, the key may be regenerated by re-employing the key generation algorithm should the system 10 or primary storage device 22 be inaccessible (e.g. destroyed) and a restore of encrypted data to a new system 10 or device 22 be desired.

System 10 may communicate with more that one remote system 26 (not shown) for redundancy or other purposes. System 10 may be directed by one of these remote systems or another supervising system (not shown) with which system 10 may communicate as to which remote system 26 should next be used to communicate with for backup. Such a configuration may also be selected by a suitable user interface.

Communication between local system 10 and remote system 26 via network 28 may be performed in accordance with techniques or protocols for secure transmission over a public network such as Secure Sockets Layer (SSL), Virtual Private Network (VPN) and the like. Such protocols usually involve the encryption and decryption of transmitted data, adding a further layer of encryption security during the transmission phase of remote backup. Communication between systems 10 and 26 may be employed using various known file copying protocols, such as "rsync", and which protocol preferably supports the deletion of files stored to system 26 to facilitate management of backed up data.

In addition to indicating which data is to be backed up as discussed previously, user input may be enabled, such as via a graphic user interface, to indicate whether the data is to be backed up locally or remotely or even both, if desired.

Remote restore operations, like local restore, require the determination of which remote backups are to be restored from and which of the contents thereof are to be restored. Similarly, a restore may be performed from remotely or locally stored backups in accordance with the configuration of system 10. A user interface operable from system 10 may present a view of all available backups on the remote system 26 and/or local system 10. A particular backup may be selected from backup device 24 (FIG. 1B), 24A or 24B (FIG. 1C) such as by clicking on a representation of the backup and some or all backed up data may be selected for restoring. Backup data may include parameters indicating an association between a backed up file and a particular user or user team. A restore may be configured to restore all the files of a backup for a particular team or user, as desired.

To restore from a particular selected backup set stored remotely, the entire particular backup set (and any necessary parent set) is copied to system 10 via network 28 to facilitate decryption at local system 10 and copying to the appropriate directories. Transmissions to system 10 via SSL or VPN are encrypted and decrypted. Received files are then decrypted using the appropriate local symmetric encryption key. If the restored backup set is too large to be accommodated on a local storage device (e.g. device 24B) the management process for paring backups may be employed to expire other backup sets as necessary and in accordance with the preferences of the management operations.

Whether stored locally or remotely, previous backups may be managed in accordance with the management operations previously described with modifications that will be understood by persons skilled in the art to permit the paring of backups stored at the remote system 26. Remote system 26 may be configured to expire backup sets stored to system 26 independently of system 10.

A second exemplary embodiment of remote backup, restore and management will now be described. Such an embodiment supports local and remote storage. To facilitate operations at the file granularity level rather than at the backup set level, backup, restore and management may be configured to identify and manipulate files and versions thereof as special directories described herein below.

Figure 5:
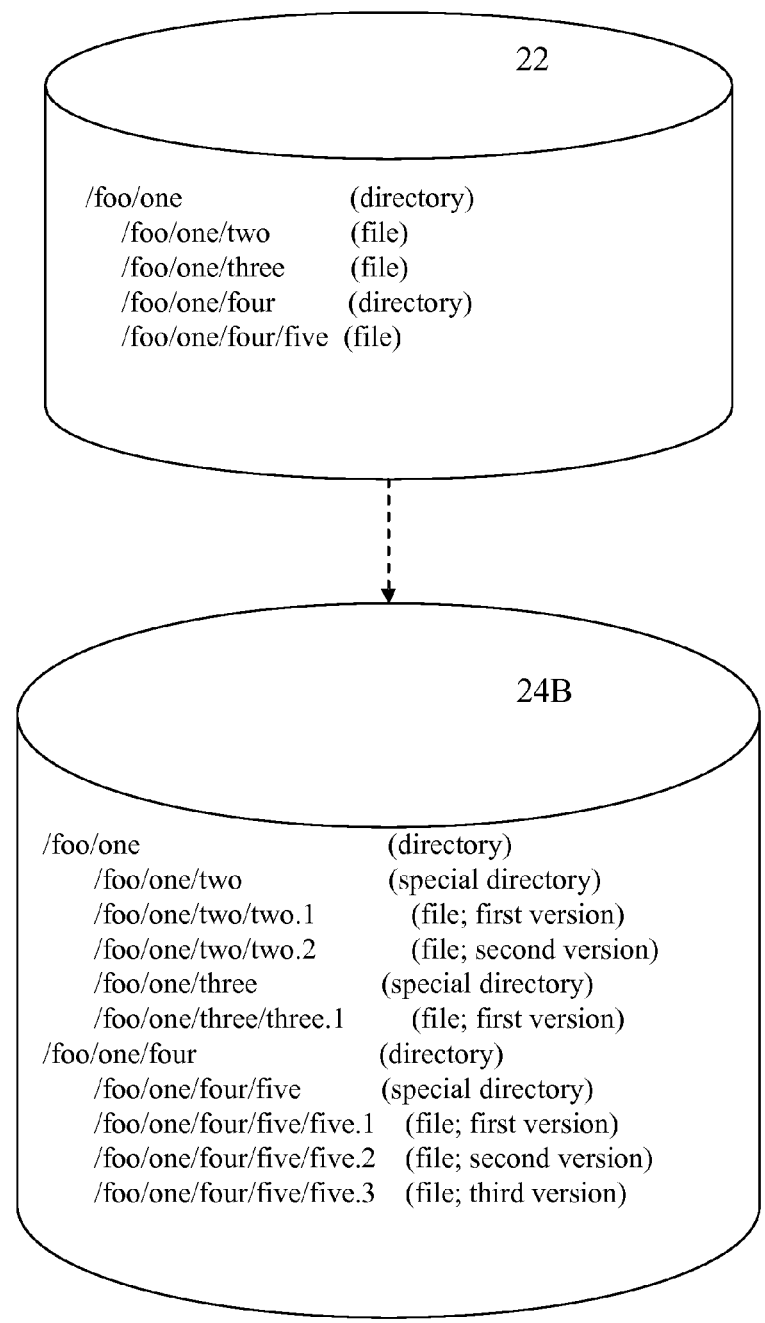
FIG. 5 is a schematic diagram showing a portion of FIG. 1C.

A directory (or folder) of files on the primary storage device 22 translates to a directory (or folder) on the backup storage device 24, 24B. A file on the primary storage device 22 translates into a special directory on the backup storage device 24, 24B containing different versions of that file in it. When performing a backup, if a file has changed since the previous backup, the new version of that file is encrypted and copied to its special directory on the backup storage device 24, 24B. Remote copying operations are described further herein below. The instance of the file on the backup storage device 24, 24B is given a name in response to its backup date and time (i.e. version). FIG. 5 illustrates primary storage device 22 storing exemplary directories and files and remote storage device 24B storing exemplary corresponding directories, special directories and file versions in accordance with the invention. For each file on primary storage device 22 that is backed up to backup device 24B (it being understood that device 24 of FIG. 1B or device 24A of FIG. 1C could also be used), a special directory for the file is created and instances of the file representing different backed up versions are stored. The version may be indicated by appending an increasing version number to the file name. Other indicators will be apparent to those skilled in the art (e.g. time and date, alphabetic reference, etc.). The specific date and time (and whatever other desired file or backup attributes) could be stored in a separate file in the special directory, or alternatively such attributes could be stored as part of each version of each file, such as in a header.

If the backup storage device 24, 24B disk fills during a backup, previous backups are deleted according to a modified version of the previously described management operations to pare backups. In accordance with the present embodiment, a log is maintained of each backup session comprising the date and time information for the backup, and the approximate size of all files that have been added to the backup storage device. This information is used by the management process to quickly determine a quantity of previous backups that need to be expired in order to prepare enough disk space for future backups.

The management process will be called upon to clear files that need to be expired, based on how much space is required to complete the current backup, keeping in mind the preferences for maintaining parent (i.e. monthly, weekly, and micro) backups to support fine grained restores. Paring the backup sets then involves deleting the instances of the files stored in the special directories for the date and time of the backup set to be pared. Note that this expiration of backups can be conducted independently on a local system 10 and on a remote backup system 26.

The same expiration operations described with reference to FIGS. 3A and 3B may be applied to the "tree" formed by the dated versions of each individual file. Each file has its own tree, and is expired separately using the same algorithm described above with reference to an entire backup set.

Restoring a particular time frame is a matter of searching for all files having a particular date and time backup attribute and copying the files to the correct (i.e. typically original) location on the primary storage device 22. Storing the backup sets as directories and special directories facilitates user navigation and selection via a GUI to restore particular directories or even files. The GUI may provide a web interface to include the remotely stored backups which would get its information just by listing a directory on a particular level.

Operations of remote copying will now be described. Authentication and encryption operations are similarly performed between the local and remote backup systems as describe with reference to previous remote backup embodiments with the exception that file versions are independently encrypted rather than the backup set as a whole. The actual process of storing backups remotely is essentially a one-way synchronization to have the backup data (i.e. directories, special directories and the special directory contents) on remote system accord with a list of the constructed and undeleted backup data sets. This synchronization is trivial when a local copy is maintained on backup device 24A, for example. The synchronization may be initiated from time to time.

In accordance with a preference, backup operations are automated to initiate transfers as soon as there is new backup data on the local system that hasn't yet been synchronized to the remote backup location. A user interface (not shown) may provide a view of all the existing "backup sets" and show the status of the remote backup for a particular set, for example, indicating in green a backup set that has been archived remotely; in orange a transfer that is in progress for a backup set; and, in red that a set transfer has not been initiated.

It will be apparent to those skilled in the art that variations and modifications to the above described will be possible without departing from the invention. For example, to facilitate encryption and authentication, a portable memory device such as a Universal Serial Bus (USB) device (not shown) may be used to store a large symmetric key for data encryption and a public key for logging into the remote system 26. The USB device may be coupled to local system 10 via I/O device 16. Access to the keys on the USB device may be password locked. Remote backups and restores can be controlled only occurring if the USB device with the authentication key is plugged in to system 10, since authentication with remote system 26 may be configured to require a public-key signature provided from the USB device. The symmetric key from the USB device may replace the hashed password described above with reference to the earlier embodiment. An administrator may make several copies of their USB device and store them securely, such as in a safety deposit boxes off-site for later recovery. Without the USB device and its unlocking password, the remote backups are useless as they cannot be retrieved or decrypted.

While the embodiments of FIGS. 1B and 1C show remote system 26 in communication with a single local system 10, remote system 26 may be configured to service more than one local system 10 (not shown). On such a remote system 26, backups from different local systems 10 may be stored in different directories of remote system 26. When network communications are in accordance with Internet protocols (IP), different local systems 10 may be identified either by IP address, domain name, or some other means, for example.

However, identification and authentication is better served using the private encryption key stored on the USB device described above to distinguish multiple clients from one another. Each local system 10 symmetric key will be the same, even if operating from a new local system 10 upon a restore.

Managing backups on the remote system 26 that is shared among a plurality of local systems 10 must account for the shared nature of this embodiment. In one sharing embodiment, remote system 26 shares its backup storage disk space among local systems 10 rateably, based on the size of the file system at local system 10 that is to be backed up. Thus those local systems 10 who need more space get more space on remote system 26 so that each local system can store about the same number of backups remotely. In another sharing embodiment, remote system 26 shares its backup storage disk space among local systems 10 equally such that each local system receives the same amount of remote capacity. Those local systems 10 having smaller file systems can store more backups remotely.

It will also be understood by persons skilled in the art that backups stored to a remote system need not be restored via network 28. Such may be copied from system 26 to a media such as a disk, including a removable disk, which media may be transported and coupled to system 10 via I/O interface 16 or through a local network coupled to network interface 18, for example. Should system 10 from which the data is backed up become destroyed or otherwise inaccessible, backup data stored remotely may be "restored" to a new system to replace system 10.

The embodiment(s) of the invention described above is(are) intended to be exemplary only. The scope of the invention is therefore limited solely by the scope of the appended claims.

We claim:

1. A method of data backup of data stored in a first storage device coupled to a computer system, the method comprising steps of:
    using at least two backup storage media in a rotational manner to:
        store at least one full backup, each full backup comprising a copy of said data selected from the first storage device in accordance with a first criteria and attribute data representative of attributes of the selected data;
        store one or more incremental backups, each incremental backup comprising a copy of said data selected from the first storage device in accordance with the first criteria and a second criteria and attribute data representative of attributes of the selected data, said second criteria being automatically determined in relation to a parent backup comprising one of a selected full backup and a previously stored incremental backup; and
        store parent data representative of the relationship of each incremental backup to its respective parent backup in a dependency data structure on at least one of the at least two backup storage media;
    wherein the steps of storing the full and incremental backups and storing the parent data in the dependency data structure are performed automatically in accordance with preconfigured settings comprising at least two different time periods so as to store different incremental backup types having respective different data granularity.

2. The method as claimed in claim 1 wherein the dependency data structure is a tree-like data structure.

3. The method as claimed in claim 1 further comprising verifying the storing of the selected data stored to the backup storage device.

4. The method as claimed in claim 1 further comprising:
    automatically paring at least one of a full and an incremental backup from the backup storage media in accordance with a plan to manage available storage space on the storage media, said plan configured in accordance with preferences to balance the available storage space and data granularity while ensuring that a full restore can be performed from any one of the storage media.

5. The method as claimed in claim 4 further comprising logging a storage space size used for each backup stored to the backup storage device; and the plan manages the amount of available storage space in response to the logged storage space size.

6. The method as claimed in claim 1 wherein at least one of the backup storage media is located remotely of said computer system and coupled to the computer system via a networks.

7. The method as claimed in claim 6 further comprising transmitting the a least one full backup and one or more incremental backups to the at least one backup storage media located remotely of said computer system, said transmitting performed in accordance with a protocol for encrypting and decrypting data transmissions.

8. The method as claimed in claim 1 further comprising encrypting data to be backed up to the backup storage media.

9. The method of claim 1 further comprising:
identifying a backup stored to the backup storage media comprising data to be restored to a second storage device coupled to the computer system; and
restoring the data to be restored to the second storage device from the data stored to the backup and any parent backups to the backup as determined from the dependency data structure.

10. A computer readable medium containing executable program instructions for backing up data from a first storage device to at least two backup storage media, coupled to a computer system, the computer readable medium comprising program instructions for directing the computer system to implement any one of the methods of claims 1–4, 5 and 6–9.

11. The method as claimed in claim 1 including receiving user input to change said preconfigured settings and storing the backups in accordance with the settings as changed.

12. The method as claimed in claim 1 comprising initiating a backup in response to a user demand received via a hardware control button.

13. A computer system comprising:
a processor;
means for coupling the processor to a first data storage device, the first data storage device comprising data to be backed up, said data having a first characteristic;
means for coupling the processor to at least two backup storage media; said process or configured to automatically use the at least two backup storage media, in accordance with pre-configured default settings:
at least one full backup, each full backup comprising a copy of said data selected from the first storage device in accordance with a first criteria and attribute data representative of attributes of the selected data;
store one or more incremental backups, each incremental backup comprising a copy of said data selected from the first storage device in accordance with the first criteria and a second criteria and attribute data representative of attributes of the selected data, said second criteria being automatically determined in relation to a parent backup comprising one of a selected previously stored full backup and an incremental backup; and
store parent data representative of a relationship of each incremental backup to its respective parent backup in a dependency data structure on at least one of the backup storage media;
wherein said default settings comprise at least two different time periods to store different incremental backup types having respective different data granularity.

14. The system as claimed in claim 13 wherein the processor is configured to:
for a first use of each of said at least two backup storage media perform at least one full backup; and
for each incremental backup to be stored to a respective one of the backup storage media, determine the second criteria in relation to a parent backup stored to the one of the backup storage media so that each backup storage media comprises at least one complete backup set.

15. The system as claim in claim 13 wherein the dependency data structure is a tree-like data structure.

16. The system as claimed in claim 13 wherein the processor is configured to:
automatically pare at least one of a full and incremental backup from the backup storage media in accordance with a plan to manage the full and incremental backups, said plan configured in accordance with preferences to balance available storage space and data granularity while ensuring that a full restore can be performed from any one of the backup storage media.

17. The system as claimed in claim 16 wherein the plan is configured to manage an amount of available storage space on the backup storage media.

18. The system as claimed in claim 13 wherein at least one of the backup storage media is located remotely from the computer system and the means for coupling the processor to the at least one remote backup storage media comprises a network; and wherein the computer system is adapted to transmit the at least one full backup and the one or more incremental backups to the at least one backup storage medium located remotely of said computer system.

19. The system of claim 18 wherein the computer system is adapted to transmit said at least one full backup and one or more incremental backups in accordance with a protocol for encrypting and decrypting data transmissions.

20. The system as claimed in claim 13 wherein the processor is configured to:
identify data to be restored to a second storage device coupled to the computer system; and
restore the data to the second storage device from the data stored to one of the backup storage media, including any backup and any one or more parent backups as determined from the dependency data structure.

21. The computer system as claimed in claim 20, wherein the processor is configured to:
encrypt data to be backed up for storing to the backup storage media; and
decrypt data to be restored.

22. The system as claimed in claim 13 including a hardware control button for initiating a backup and wherein said processor is configured to store data for backup in response to a user demand received via said hardware control button.

23. The system as claimed in claim 13 including a hardware control button for initiating a restore and wherein said processor is configured to restore data from said at least two backup storage media in response to a user demand received via said hardware control button.

24. The system of claim 13 wherein the backup storage media comprises at least one RAID device.

* * * * *